United States Patent [19]

Schmitt

[11] 3,916,951

[45] Nov. 4, 1975

[54] HOT AND COLD WATER MIXING VALVE

[75] Inventor: William C. Schmitt, Brown Deer, Wis.

[73] Assignee: Milwaukee Faucets, Inc., Milwaukee, Wis.

[22] Filed: May 23, 1974

[21] Appl. No.: 472,678

[52] U.S. Cl. .......................................... 137/625.41
[51] Int. Cl.² ....................................... F16K 11/085
[58] Field of Search........... 137/454.2, 454.6, 625.4, 137/625.41; 251/285, 288

[56] References Cited
UNITED STATES PATENTS

| | | |
|---|---|---|
| 3,645,289 | 2/1972 | Schmitt............................ 137/454.2 |
| 3,674,048 | 7/1972 | Manoogian et al. ........ 137/625.41 X |
| 3,788,601 | 1/1974 | Schmitt........................ 137/454.6 X |

*Primary Examiner*—Henry T. Klinksiek
*Attorney, Agent, or Firm*—James E. Nilles

[57] ABSTRACT

A hot and cold water mixing valve having hot and cold water inlet ports controlled by a disc valve located on the inner end of a rotatable stem. The stem also includes an enlarged body portion which, together with a cartridge body forms the mixing chamber. The enlarged portion of the stem is also of considerable axial length which contributes to a good bearing surface for the rotatable stem and precludes tipping of the stem and valve disc.

4 Claims, 12 Drawing Figures

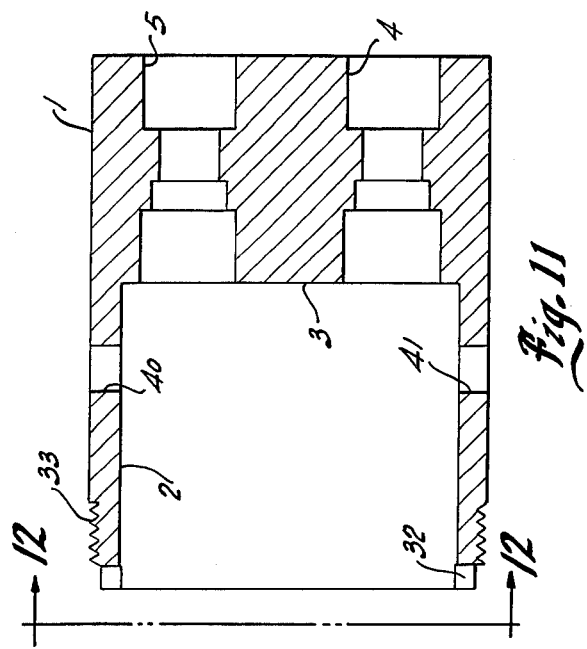
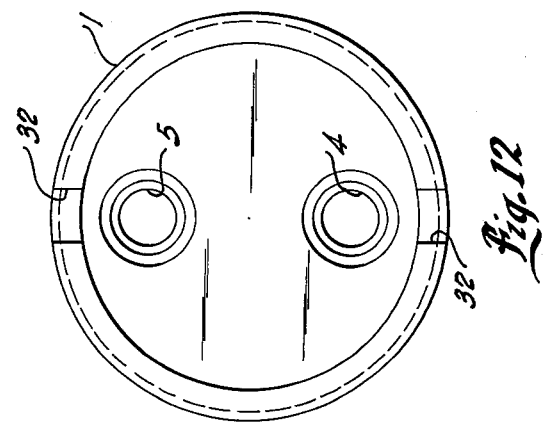
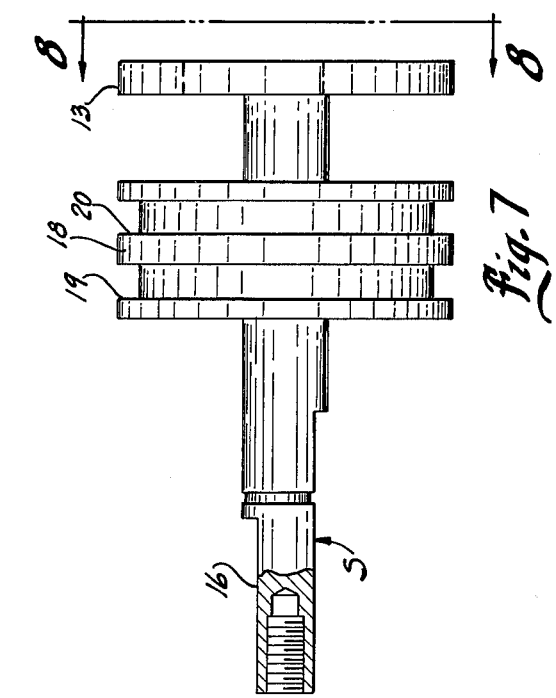
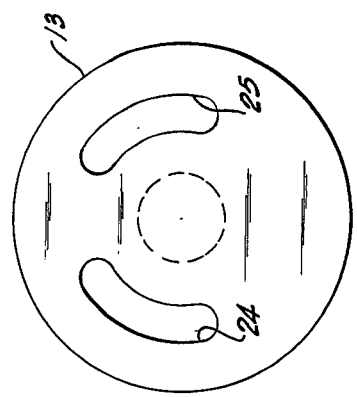
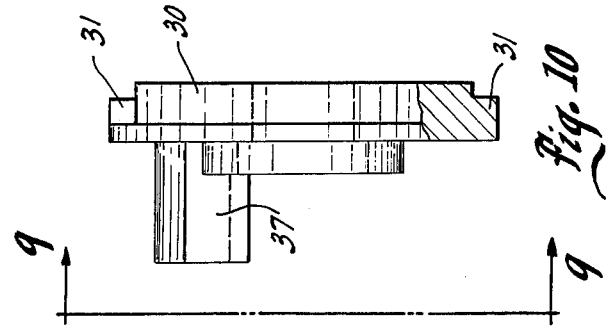
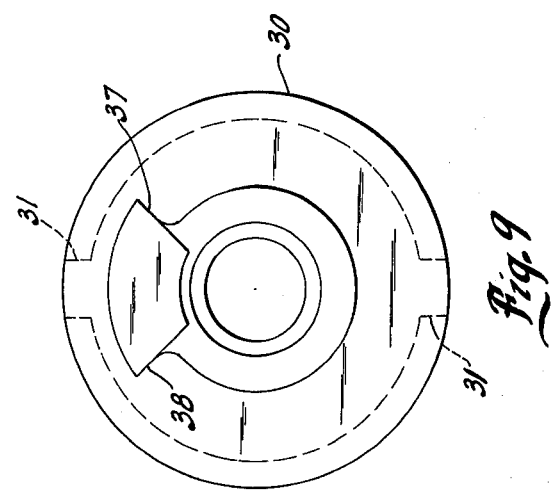

HOT AND COLD WATER MIXING VALVE

BACKGROUND OF THE INVENTION

The invention pertains generally to mixing valves for hot and cold water of the type which are concerned with temperature control of the water rather than with volume control of the water. In these valves, a rotatable element can be moved from a neutral or closed position through a cold water position and then through a mixing position to a full hot position.

An example of this general type of valve is shown in the U.S. Pat. No. 3,674,048 which issued on July 4, 1972. That valve, however, employed numerous parts including a separate bushing which defined a portion of the mixing chamber. It also employed numerous seals which were subject to leakage problems. These are some of the shortcomings of the prior art devices.

SUMMARY OF THE INVENTION

The present invention provides a hot and cold water mixing valve of simplified construction employing a minimum number of parts and particularly utilizing a minimum number of seals between the mixing chamber and rotatable stem. Another aspect of the invention relates to a valve of this type in which the stem is formed integrally with a valve disc and a radially and axially enlarged sealing portion. The arrangement is such that the stem, together with the cylindrical wall of the cartridge body, defines the mixing chamber. A minimum number of seals is necessary between the enlarged portion of the stem and the cartridge body in order to provide an effective seal. The valve stem provided by the present invention is also constructed in such a manner that it forms a good bearing surface with the cartridge body which enhances its stability and smooth operation.

These and other objects and advantages of the invention will appear hereinafter as this disclosure progresses.

BRIEF DESCRIPTION OF THE DRAWINGS

FIG. 7 is an elevational view of the stem shown in FIG. 1;

FIG. 8 is an end view taken generally along the line 8—8 in FIG. 7.

FIG. 9 is a top view of the cartridge top, the view being taken along line 9—9 of FIG. 10;

FIG. 10 is a side view of the cartridge top;

FIG. 11 is a longitudinal cross sectional view through the cartridge; and

FIG. 12 is a top view of the cartridge taken along the line 12—12 in FIG. 11.

DESCRIPTION OF THE PREFERRED EMBODIMENT

Figure 6:
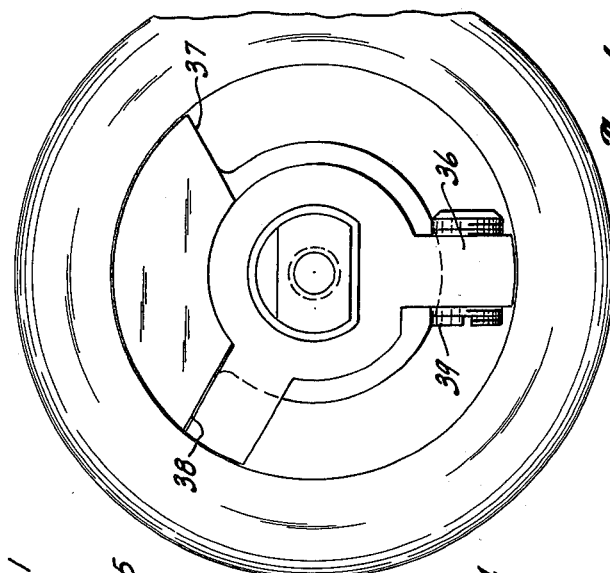
FIG. 6 is an end view of the valve cartridge shown in FIG. 1, the view being taken generally along the line 6—6 in FIG. 1.
Figure 1:
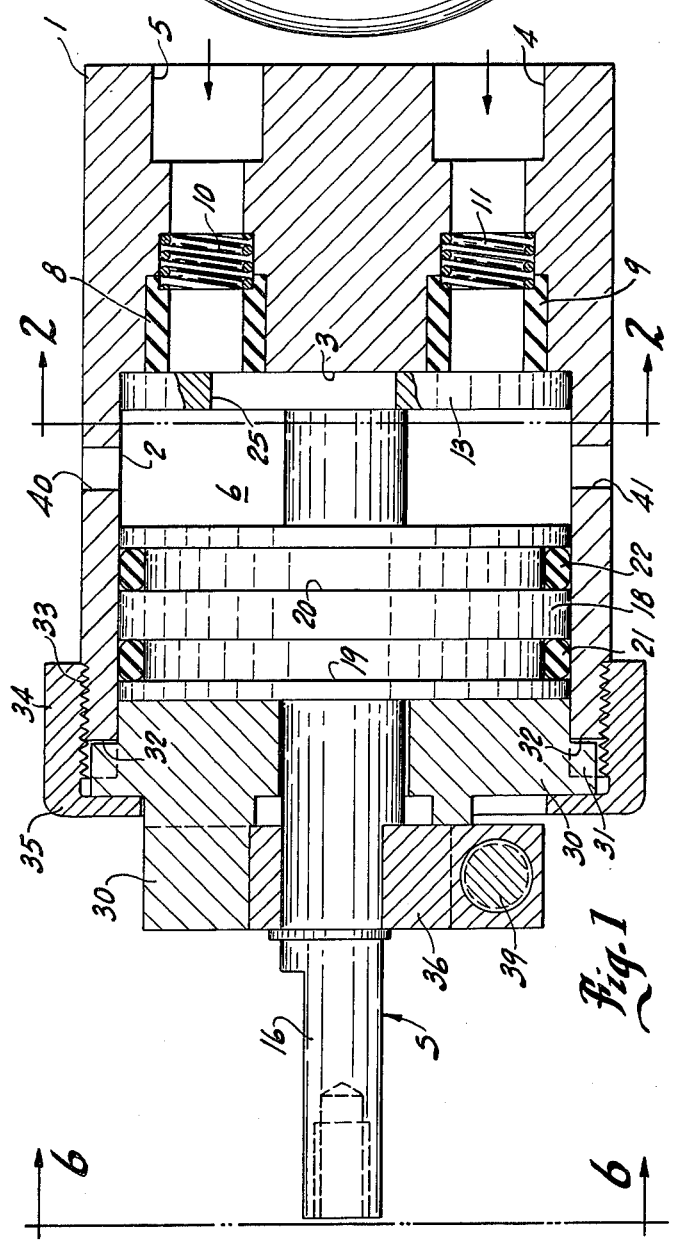
FIG. 1 is a longitudinal cross sectional view through a mixing valve made in accordance with the present invention.

The cartridge assembly shown in FIG. 1 includes a cylindrical cartridge 1 having a large bore 2 extending from one end and terminating in an inner end wall 3. An inlet passage 4 and an inlet passage 5 for hot and cold water, respectively, extend from the mixing chamber 6 that is defined by the bore 2 and outwardly of the cartridge where they can communicate with sources of hot and cold water (not shown) in the known manner.

Each of the passages 4 and 5 has a cylindrical seal 8 and 9, respectively, which are urged by their springs 10 and 11, respectively, into sealing engagement with a valve disc 13 of the stem S, now to be described.

The stem S includes a handle in the form of an operating portion 16 which extends outwardly from the cartridge. The stem also includes a radially enlarged cylindrical portion 18 which is also of considerable axial length and around the periphery of which are formed two sealing grooves 19 and 20. O-ring seals 21 and 22 are located in the grooves 19 and 20 and form a rotatable seal with the bore 2. The stem also includes the valve disc 13 at its inner end and which abuts against the inner end wall 3 of the cartridge and is rotatable in respect thereto. This valve disc has a pair of openings in the forms of kidney-shaped ports 24 and 25, each of which is registerable with the inlets 4 and 5, depending on the direction and the extent of rotation of the valve disc 13, as shown in FIGS. 2 to 5, inclusive.

The enlarged portion 18 of the stem is held captive in the bore 2 by the cartridge top 30 which is insertable partially into the bore. A pair of ears 31 extending from the top 30 engage in slots 32 of the cartridge, to prevent relative rotation between the top and the cartridge. The top 30 is releasably clamped in the cartridge by a removable cap nut 35 threadably engaged as at 33 with the threaded end of the cartridge body. Radially inwardly extending flange 34 of the cap nut 35 extends over the top 30 to hold the top captive. An inwardly extending stop 36 is carried by the top 30 and has stop surfaces 37 and 38 which are engaged by an adjustable stop 39 secured on the stem so as to limit the rotation of the stem in either the hot or cold water directions.

Outlet ports 40 and 41 extend from the mixing chamber 6 and by means of which the water is directed to the spigot or the like (not shown) in the conventional manner.

Figure 5:
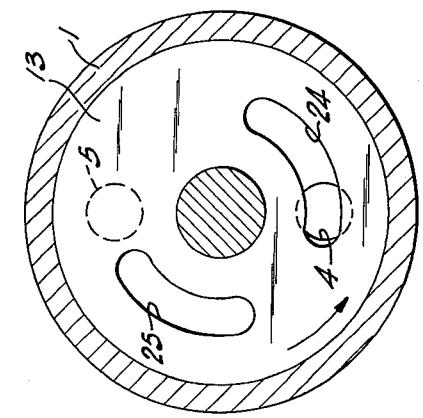
FIGS. 3, 4 and 5 are views similar to FIG. 2 but on a smaller scale and showing the relative rotation of the valve disc as it is rotated through various positions.
Figure 4:
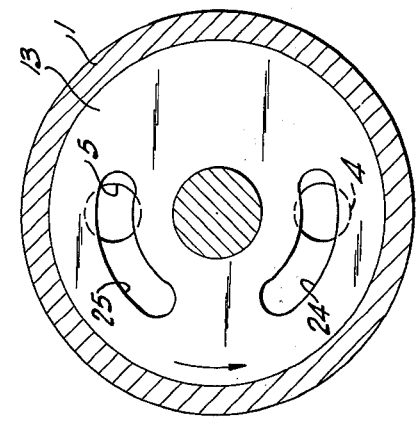
Figure 3:
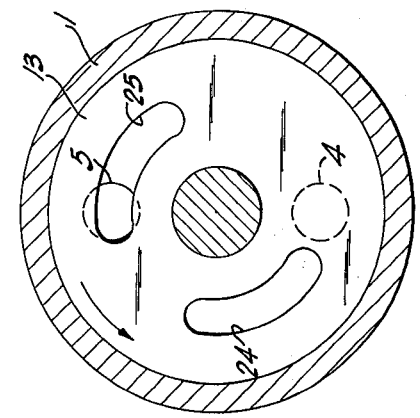
Figure 2:
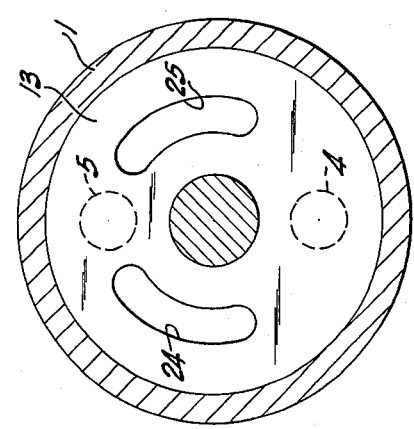
FIG. 2 is a transverse sectional view taken along the line 2—2 of FIG. 1.

As shown in FIGS. 2 to 5, a sequence of rotational movement of the valve disc relative to the inlet ports 4 and 5 is illustrated. FIG. 2 shows the valve in the neutral or closed position in which no water flows. Then the operator in starting to draw water, turns the valve as shown in FIG. 3 so that the kidney-shaped port 25 commences to register with the cold water inlet 5, thereby commencing the draw of cold water. FIG. 4 shows the valve disc when turned further so as to present a mixing of the hot and cold water. Thus, cold water is first drawn and there is no danger of being scalded by hot water. FIG. 5 then illustrates the situation when the valve disc has been turned to the full hot condition in which only the kidney-shaped port 24 is registering with the hot water. The present valve is thus a mixing valve to control temperature and not a volume control for the water.

With the above arrangement, the stem, together with its integral enlarged portion 18 and the valve disc 13, is rotatable in the cartridge body. The mixing chamber 6 is defined by the bore of the cartridge body and by the inner surface 44 of the enlarged portion 18 of the stem. The only sealing means required between the mixing chamber and the upper end of the stem are the O-rings 20 and 21. Under certain circumstances, only one O-ring may be necessary.

A minimum number of parts, particularly sealing means, is possible with the assembly provided by the present invention. Because of the radially and axially enlarged portion 18, a good bearing surface is provided for the rotatable stem and which eliminates tipping or wobbling of the stem and enhances smooth action and good seal engagement between the valve disc 13 and the inlets 4 and 5.

I claim:

1. A hot and cold water mixing valve comprising a cylindrical cartridge body having a bore therein including an inner end wall, said cartridge body also having separate hot and cold water inlet ports extending separately through said body and opening into said bore through said inner end wall, a rotatable stem in said bore and including an operating portion extending from said cartridge and also including a radially enlarged cylindrical portion rotatable in said bore, fluid sealing means including a pair of axially spaced apart O-ring seals between said enlarged cylindrical portion and said bore, said enlarged cylindrical portion being of sufficient axial length so as to accommodate said pair of O-ring seals and provide a good rotatable bearing surface for said stem to prevent tipping of the stem, said stem also including a valve disc at its inner end and which disc abuts against said inner end wall of said bore and is rotatable in respect thereto, said enlarged portion of said stem being axially spaced from said valve disc so as to define a hot and cold water mixing chamber with said bore, said disc having openings which are registerable with said hot and cold water inlet ports of said cartridge body, and a removable threaded cap nut threadably engaged with said stem for holding said rotatable stem captive in said cartridge.

2. The mixing valve set forth in claim 1 including an adjustable stop fixed to said operating portion of said stem, a cartridge top extending outwardly of said cap nut, and said cartridge top has stop surfaces against which said adjustable stop can abut to limit rotational movement of the stem relative to the cartridge in either direction.

3. The mixing valve as set forth in claim 1 including a cartridge top extending outwardly of said cap nut, and further characterized in that said cartridge and said cartridge top have interengagable means which prevent relative rotation therebetween.

4. The mixing valve set forth in claim 2 further characterized in that said cartridge and said cartridge top have interengagable means which prevent relative rotation therebetween.

* * * * *